United States Patent
Wipf et al.

(10) Patent No.: US 9,643,794 B2
(45) Date of Patent: May 9, 2017

(54) PRODUCT-STREAM-TRANSFER APPARATUS

(71) Applicant: Robert Bosch GmbH, Stuttgart (DE)

(72) Inventors: Alfred Wipf, Jestetten (DE); Frank Ernst, Dachsen (CH); Christian Reichardt, Feuerthalen (CH); Markus Landolt, Hallau (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/037,600

(22) PCT Filed: Nov. 10, 2014

(86) PCT No.: PCT/EP2014/074203
§ 371 (c)(1),
(2) Date: May 18, 2016

(87) PCT Pub. No.: WO2015/071228
PCT Pub. Date: May 21, 2015

(65) Prior Publication Data
US 2016/0289010 A1    Oct. 6, 2016

(30) Foreign Application Priority Data

Nov. 18, 2013  (DE) .................. 10 2013 223 494

(51) Int. Cl.
*B65G 47/68*    (2006.01)
*B65G 19/02*    (2006.01)
(Continued)

(52) U.S. Cl.
CPC ........... *B65G 47/681* (2013.01); *B65G 19/02* (2013.01); *B65G 47/71* (2013.01); *B65G 54/02* (2013.01)

(58) Field of Classification Search
CPC .... B65G 47/68; B65G 47/681; B65G 47/082; B65G 15/30
(Continued)

(56) References Cited

U.S. PATENT DOCUMENTS 2,619,216 A * 11/1952 Kinnicutt, Jr. ....... B65G 19/205
                                                      198/449
3,339,701 A *  9/1967 Weichhand ............ B65G 17/12
                                                      198/449
(Continued)

FOREIGN PATENT DOCUMENTS

DE    2510395    9/1975
DE    20201419   6/2002
(Continued)

OTHER PUBLICATIONS

International Search Report for Application No. PCT/EP2014/074203 dated Feb. 4, 2015 (English Translation, 3 pages).

*Primary Examiner* — James R Bidwell
(74) *Attorney, Agent, or Firm* — Michael Best & Friedrich LLP (57) ABSTRACT

The invention proceeds from a product-stream-transfer apparatus (10*a*) for transferring at least a first product sub-stream (12*a*) and a further product sub-stream (14*a*) into a main product stream (16*a*) or for separating a main product stream into at least a first product sub-stream and a further product sub-stream along a product-stream-transfer route (18*a*), having a first side route (20*a*) with a multiplicity of transporting elements (22*a*) for transporting products (24*a*) of the first product sub-stream (12*a*), having at least a further side route (26*a*) with a multiplicity of transporting elements (22*a*) for transporting products (24*a*) of the further product sub-stream (14*a*), and having a main route (28*a*), which is adjacent to the product-stream-transfer route (18*a*) and is intended for transporting the products (24*a*) of the main product stream (16*a*). It is proposed for at least sub-quantities of the transporting elements (22*a*) to be driveable independently of one another at least along one of the side routes (20*a*; 26*a*) of the product-stream-transfer route (18*a*).

20 Claims, 6 Drawing Sheets (51) Int. Cl.
*B65G 47/71* (2006.01)
*B65G 54/02* (2006.01)

(58) Field of Classification Search
USPC .................................... 198/447, 448, 449
See application file for complete search history.

(56) References Cited

U.S. PATENT DOCUMENTS

| | | | | |
|---|---|---|---|---|
| 5,722,532 | A * | 3/1998 | Troisi | B65G 47/682 198/440 |
| 6,125,990 | A | 10/2000 | Rupert et al. | |
| 6,966,423 | B2 * | 11/2005 | Monti | B65B 35/54 198/447 |
| 2010/0025189 | A1 * | 2/2010 | Muller | B65H 29/6681 198/418.1 |
| 2015/0027852 | A1 | 1/2015 | Konrad et al. | |

FOREIGN PATENT DOCUMENTS

| | | |
|---|---|---|
| DE | 102006025090 | 8/2007 |
| DE | 102009029314 | 8/2010 |
| DE | 102012201059 | 7/2013 |
| EP | 1533257 | 5/2005 |
| EP | 1645340 | 4/2006 |
| JP | 4919574 | 2/1974 |
| JP | 2006327766 | 12/2006 |
| NL | 8401073 | 11/1985 |

* cited by examiner

PRODUCT-STREAM-TRANSFER APPARATUS

BACKGROUND OF THE INVENTION

A product-stream-transfer apparatus for transferring at least one first product sub-stream and a further product sub-stream into a main product stream or for separating a main product stream into at least one first product sub-stream and a further product sub-stream along a product-stream-transfer route, with a first side route having a multiplicity of transporting elements for transporting products of the first product sub-stream, with at least one further side route having a multiplicity of transporting elements for transporting products of the further product sub-stream, and with a main route, which is adjacent to the product-stream-transfer route, for transporting the products of the main product stream, has already been proposed.

SUMMARY OF THE INVENTION

The invention is based on a product-stream-transfer apparatus for transferring at least one first product sub-stream and a further product sub-stream into a main product stream or for separating a main product stream into at least one first product sub-stream and a further product sub-stream along a product-stream-transfer route, with a first side route having a multiplicity of transporting elements for transporting products of the first product sub-stream, with at least one further side route having a multiplicity of transporting elements for transporting products of the further product sub-stream, and with a main route, which is adjacent to the product-stream-transfer route, for transporting the products of the main product stream.

It is proposed that at least partial quantities of the transporting elements are drivable independently of one another at least along one of the side routes of the product-stream-transfer route. In this connection, a "product stream" is intended to be understood as meaning in particular a sequence of products transported along a path. The products can be transported along the path in particular in a continuous stack extending along the path, individually and/or in product groups. The path can preferably be a straight line at least in sections. However, path shapes deviating from a straight line, such as curves and/or in particular circular paths and/or circular path segments, are also possible. In this context, a "route" is intended to be understood as meaning in particular a portion of a path. A "product-stream-transfer route" is intended in this context to be understood as meaning in particular a route portion along which the path of at least one product sub-stream approaches the path of the main product stream in order to bring together products from the side routes onto the main route, or along which the path of the product sub-streams moves away from the path of the main product stream in order to distribute products from the main route to the side routes. In this context, a distance between two paths is intended to be understood as meaning a distance perpendicular to the mean transporting direction of the paths. By transferring or separating the products along a product-stream-transfer route, a continuous transfer or separation of product streams can be achieved during a transporting movement. Shutdowns as may be necessary if products are inserted into a product stream or are removed from a product stream perpendicular or approximately perpendicular to a transporting direction can be avoided. In this context, a "transporting element" is intended to be understood as meaning in particular an element which is provided for transporting a product and/or a product group along a route. The products and/or the product groups can rest on the transporting elements and/or can be placed into the transporting elements and carried by the latter. The transporting elements can have suckers and can grasp and transport the products and/or product groups by means of application of a vacuum. Suckers can preferably be arranged counter to a weight above the products and/or product groups and can raise same for transport. The transporting elements can entirely or partially engage around the products and/or product groups resting on a product guide by means of a product shoe, which is adapted to a shape of the products, from a side opposite the product support. The transporting elements can have drivers which project through a recess in the product support into the product stream in order to push the products and/or product groups in the transporting direction. The products and/or product groups can preferably rest on the product guide, in particular a feed carrier, and can be pulled or in particular pushed by the transporting elements via the product guide. Transporting elements and products can move along a common path or differing paths, wherein the transporting elements transmit at least one movement component to the products. The product-stream-transfer apparatus can have transporting elements of different design. In particular, different side routes can have transporting elements differing in design. For example, transporting elements of a first side route for transporting the products and/or product groups can have drivers which project downward into the product stream counter to the direction of the weight, and transporting elements of a further side route can carry the products and/or product groups with suckers from the side opposite the product support. This may be advantageous in particular if products of the one side route are intended to be deposited onto the products of the further side route in the product transfer route. As a result, a "product" is intended to be understood as meaning in general a product transported by a transporting element and/or a product group transported by a transporting element. In this context, "drivable independently" is intended to be understood as meaning in particular that the transporting elements are drivable independently in the transporting direction. In particular, the transporting elements can be driven at variable speeds differing from one another, and therefore distances between the transporting elements and therefore between products transported by the transporting elements can be increased and/or reduced during the transport. In this context, a "partial quantity" of transporting elements is intended to be understood as meaning in particular that the transporting elements can be combined into groups. In particular, the transporting elements can form two, preferably three, partial quantities. The transporting elements of a partial quantity can be jointly driven. Transporting elements of different partial quantities can be drivable independently. The transporting elements can preferably can belong to the various partial quantities in an alternating manner in the transporting direction. For example, in the case of three partial quantities, in the transporting direction a transporting element can belong to the first partial quantity, the next transporting element can belong to the second partial quantity, the next transporting element to the third partial quantity and the next transporting element again to the first partial quantity, etc. Consecutive transporting elements can be drivable independently. A number of required drives can be reduced. The transporting elements can be driven by revolving elements, such as, in particular, transporting belts. Each revolving element can drive a transporting element or preferably a partial quantity of transporting elements. It can likewise be possible for the transporting elements each to have dedicated drives, which are moved with the transporting elements, or to be parts of a drive. It is possible for at least partial quantities of the transporting elements to be drivable independently of one another along a first side route of the product-stream-transfer route. The transporting elements can be jointly driven at a common speed along further side routes and/or along the main route. Independently drivable transporting elements and transporting elements driven jointly may differ in design. A number of products fed along the side routes can be variable. If the product sub-streams of the side routes are intended to be transferred into a main product stream, the products can preferably be fed to the first side route in such a manner that gaps between products of the further side route are filled. The product sub-streams can be transferred into the main product stream in a continuous transporting movement, or the main product stream can be separated into the product sub-streams in a continuous transporting movement. At least partial quantities of the transporting elements are preferably drivable independently of one another along a plurality of side routes, particularly preferably along all of the side routes, of the product transfer route, and, particularly preferably, all of the transporting elements along all of the side routes of the product transfer route are in each case drivable independently of one another. The product sub-streams of the side routes can be brought together in a freely determinable ratio to form the main product stream, or the main product stream can be divided in a freely determinable ratio between the product sub-streams. Products of a product sub-stream are preferably transferred into gaps of products of a further product sub-stream in order to form the main product stream. Alternatively, it can be possible for products of a product sub-stream to be deposited onto, next to, in front of or behind products of a further product sub-stream. A main product stream which contains stacks and/or rows of products of the product sub-streams can be formed.

Advantageously, at least one linear motor system is proposed which, at least along a side route of the product-stream-transfer route, has a stator and a multiplicity of independently drivable translators which are provided to drive the transporting elements independently of one another. In this context, a "linear motor system" is intended to be understood as meaning a system which has at least one stator and a multiplicity of translators which are drivable and movable along the stator. The stator can extend along a straight line, but also along a curve and/or a circular path. Height differences and/or distances between the paths of the side routes can be compensated for. The stator preferably follows the path of the side route. The stator can be designed as a secondary part, preferably as a primary part, of the linear motor. The stator preferably has, at least in sections, stator windings which are independently activatable. A magnetic field of traveling waves can be independently produced for each translator located within the range of influence of the stator. The translators can be driven independently. The translators can be designed as primary parts, preferably as secondary parts, of the linear motor system. The translators preferably have permanent magnets. The translators can be of passive design. Moving lines for conducting current to the translators can be dispensed with. The linear motor system preferably has travel and/or position measuring means which are provided in order to measure the positions and/or speeds of the translators relative to the stator. A control unit is preferably provided for controlling and/or regulating position and/or speed of the translators. Such linear motor systems with independently drivable translators are known to a person skilled in the art. One translator is preferably provided in each case for driving one transporting element. A multiplicity of translators can be drivable independently along the stator. Mechanical and/or electric moving means, such as, in particular, cables and/or drive belts or drive chains, for driving the translators can be dispensed with. A plurality of stators can be arranged along a route, preferably next to one another perpendicular to the transporting direction. The stators can each be provided for driving a partial quantity of the translators of the route. The translators can preferably be assigned in an alternating manner along the transporting direction to one of the stators. A minimum distance to be observed between the translators in the transporting direction can be reduced. In particular, the translators can be arranged next to one another perpendicular to the transporting direction, and therefore the translators can overlap in the transporting direction. In an alternative refinement, a plurality of translators, in particular two translators, can be provided for driving a transporting element. In particular, the transporting element can be of multi-part design and the translators arranged on a transporting element can drive different parts of the transporting element. The translators can drive a relative movement of parts of the transporting element with respect to one another. In particular, the relative movement can be used to drive further movements of the transporting element differing from the transporting direction. The translators can be mounted independently of the transporting elements on guide means. A path along which the translators are moved can differ from the path along which the transporting elements are moved. Movement transmission means can be provided for transmitting at least one movement component of the translators to the transporting elements. The translators can preferably be mounted on the transporting elements. Guide means for the mounting of the translators can be dispensed with. Translators formed by permanent magnets can preferably be fixedly connected to the transporting elements.

Furthermore, it is proposed that the transporting elements of at least two side routes are transferred, subsequent to the product-stream-transfer route, to the main route, or that transporting elements of the main route are distributed to at least two side routes at the beginning of the product-stream-transfer route. After a section of the main route, the transporting elements are preferably distributed again in one revolution to the side routes and returned thereto, or, after a section of the side routes, are returned again in one revolution to the main route. The transporting elements can be brought together jointly with the products of the product sub-streams to form the main product stream, or can be distributed from the main product stream to the product sub-streams. It may be possible for the transporting elements to carry the products. Further guide means for guiding the products can be dispensed with. Different movement paths of the transporting elements and the products can be avoided. In particular, movable elements for compensating for relative movements occurring between products and transporting elements can be avoided.

Advantageously, a stator of the linear motor system is arranged on the main route at least along a section adjacent to the product-stream-transfer route, said stator being provided for driving the transporting elements, which are transferred from the side routes to the main route or the transporting elements which are to be distributed from the main route to the side routes, along the section. The stator can drive the translators arranged on the transporting elements and, with said translators, can drive the transporting elements. The transporting elements can be independently drivable along that section of the main route on which the stator is arranged. The transporting elements coming from the side routes or to be distributed to the side routes can be driven along the section of the main route by a common stator. Further stators can be dispensed with along said section. It is possible to avoid arranging a plurality of stators next to one another along the section of the main route. Malfunctions between stators arranged next to one another can be avoided. Costs can be reduced.

Furthermore, at least one product-stream-control means is proposed which is provided for inserting products of at least one of the product sub-streams into the main product stream in transfer movements transversely with respect to a transporting direction of the main product stream along the product-stream-transfer route, or for distributing at least a partial quantity of the products of the main product stream to the product sub-streams in transfer movements transversely with respect to the transporting direction of the main product stream along the product-stream-transfer route. The product-stream-control means can advantageously insert the products into the main product stream or distribute same from the main product stream to the product sub-streams. The product-stream-control means can guide the products directly. In particular, the product-stream-control means can be designed as side guides which bring the products during transport in the transporting direction closer together or separate same. The product-control means can also be designed as guides of the transporting elements that bring the transporting elements closer together during transport in the transporting direction or separate same further. The transporting elements can therefore bring the products closer together during transport in the transporting direction or separate same further. Furthermore, the transporting elements can have product-stream-control means which are provided for bringing the products closer together during transport in the transporting direction or for separating same further in order to insert said products into the main product stream or to distribute same to product sub-streams.

It is proposed that the transporting elements of at least one side route have drivers, which are mounted movably in the direction of the transfer movement, for transporting the products. The drivers can form product-stream-control means or can be part of a product-stream-control means. Alternatively, the drivers can compensate for relative movements between products and transporting elements. In particular, the drivers and the transporting elements can be guided along differing paths. The products can be guided along the product-stream-transfer route along paths along which the products approach or move away transversely with respect to the transporting direction. The products can be brought together from product sub-streams to form a main product stream or can be distributed from a main product stream to product sub-streams. The transporting elements can be guided along the product-stream-transfer route along a straight path. A guide and/or drive of the transporting elements can be constructed particularly simply.

It is furthermore proposed that the transporting elements of at least one side route have drivers, which are mounted so as to be insertable into and/or removable from the product sub-stream of the side route, for transporting the products. In particular, the drivers can enter, i.e. can be inserted, into the product sub-stream in order to take over and to drive the products from a transporting device mounted upstream. The drivers can be removed from the product sub-stream in order to transfer the products to a further transporting device. The drivers can preferably be mounted so as to be insertable into and/or removable from the product sub-stream and so as to be movable in the direction of the transfer movement.

The drivers can preferably be mounted so as to be insertable into and/or removable from the main product stream when the transporting elements move along the main product stream. A grouping of the products can be changed during the transfer into the main product stream or during the separation into product sub-streams by inserting and/or removing drivers. In particular, stacks and/or groups of a plurality of products or product groups can be formed by drivers which transport products being removed from the product stream such that the product forms a group or a stack with the following product. The product sub-streams can have different products. Different products of the product sub-streams can be brought together into stacks or groups in the main product stream.

Furthermore, it is proposed that the main product stream forms a product sub-stream of a further product-stream-transfer apparatus. A plurality of product-stream-transfer apparatuses can form a cascade. Product streams can be brought together or divided in multiple stages.

Furthermore, a feed apparatus for a packaging machine with a product-stream-transfer apparatus is proposed. The feed apparatus can feed a plurality of product sub-streams of processes mounted upstream into a main product stream of the packaging machine. A packaging machine can have the feed apparatus. The feed apparatus and/or the packaging machine can have the advantages mentioned.

The product-stream-transfer apparatus according to the invention is not intended to be restricted here to the above-described use and embodiment. In particular, the product-stream-transfer apparatus according to the invention can have a number of individual elements, components and units differing from a number thereof mentioned therein in order to carry out a manner of operation described therein.

BRIEF DESCRIPTION OF THE DRAWINGS

Further advantages emerge from the description below of the drawing. The drawing illustrates exemplary embodiments of the invention. The drawing, the description and the claims contain numerous features in combination. A person skilled in the art will expediently also consider the features individually and combine them into meaningful further combinations.

In the drawing.

DETAILED DESCRIPTION

Figure 1:
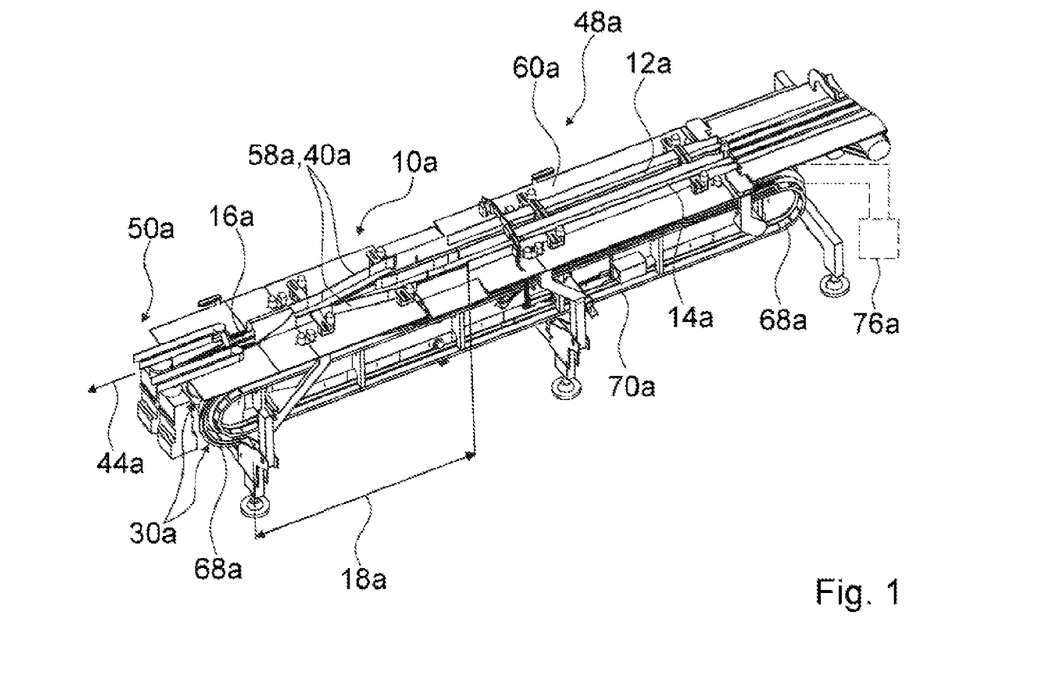
FIG. 1 shows a schematic illustration of a feed apparatus with a product-stream-transfer apparatus in a first exemplary embodiment.
Figure 2:
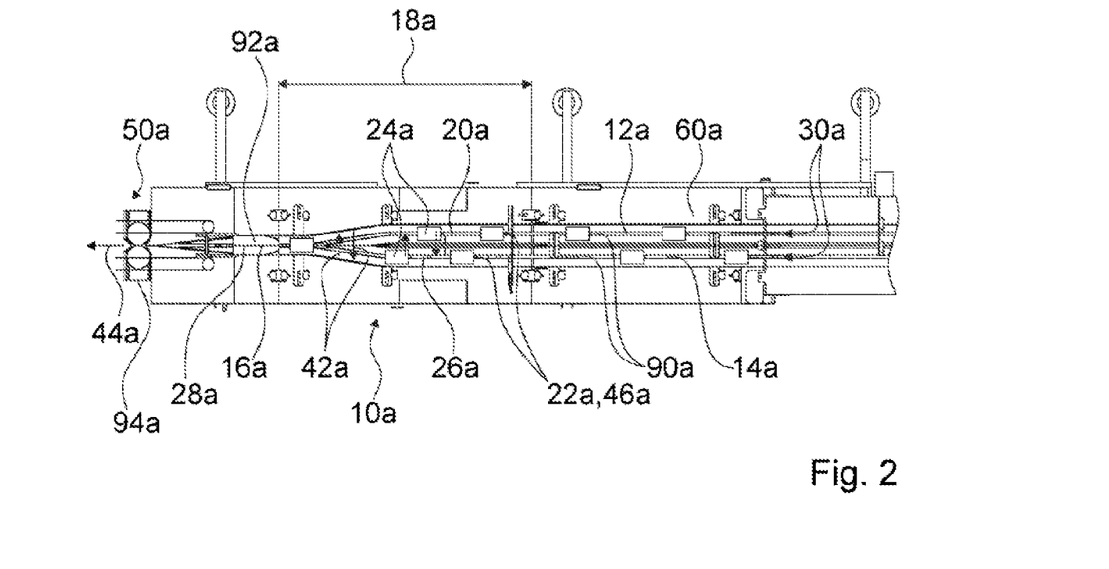
FIG. 2 shows a top view of the feed apparatus from FIG. 1.

FIG. 1 and FIG. 2 show a feed apparatus 48a for a packaging machine 50a, which is merely indicated here and is designed as a tube packing machine, with a product-stream-transfer apparatus 10a. The product-stream-transfer apparatus 10a is provided for transferring a first product sub-stream 12a and a further product sub-stream 14a into a main product stream 16a along a product-stream-transfer route 18a. A multiplicity of transporting elements 22a (FIGS. 2-4) for transporting products 24a are arranged along a side route 20a of the first product sub-stream 12a and a further side route 26a of the further product sub-stream 14a. A main route 28a for transporting the products 24a brought together in the main product stream 16a is adjacent to the product-stream-transfer route 18a with the first side route 20a and the further side route 26a. Along the product-stream-transfer route 18a, paths of the product sub-streams 12a, 14a, along which the products 24a are transported along the side routes 20a, 26a, approach the path of the main product stream 16a, along which products are transported along the main route 28a.

The product-stream-transfer apparatus 10a has two linear motor systems 30a which, along the side routes 20a, 26a of the product-stream-transfer route 18a, each have a stator 32a and a multiplicity of independently drivable translators 34a which are provided for driving the transporting elements 22a independently of one another. The translators 34a are arranged on the transporting elements 22a and are fixedly connected thereto. The translators 34a engage around the respective stator 32a of the side routes 20a, 26a in a U-shaped manner with a secondary part, which has permanent magnets 52a, of the respective linear motor system 30a. The stators 32a have individually activatable motor windings with poles 54a for generating an electromagnetic field of traveling waves. Furthermore, the translators 34a have positioning means 56a which are identified via further position measuring coils (not illustrated specifically here) of the stators 32a. A common control unit 76a for controlling the two linear motor systems 30a can therefore determine site and speed of the translators 34a and can activate the motor windings of the respective stators 32a in such a manner that the transporting elements 22a are driven independently of one another at a desired speed profile.

The product-stream-transfer apparatus 10a has product-stream-control means 40a which are designed as side guides 58a and are provided for inserting products 24a of the product sub-streams 12a, 14a into the main product stream 16a in transfer movements 42a transversely with respect to a transporting direction 44a of the main product stream 16a along the product-stream-transfer route 18a. The products 24a rest on a feed carrier 60a formed from a flat metal sheet. A distance between the side guides 58a is reduced in the transporting direction 44a in which the transporting elements 22a push the products 24a along the product-stream-transfer route 18a. The products 24a are therefore pushed together laterally until they form the main product stream 16a. The transporting elements 22a are activated here in such a manner that the products 24a of the product sub-streams 12a, 14a are each pushed into gaps of the products 24a of the other product sub-stream 12a, 14a in each case.

Figure 4:
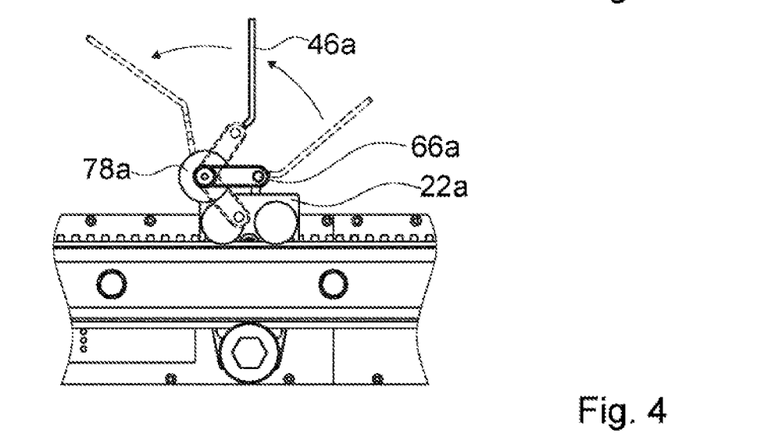
FIG. 4 shows a detail of the product-stream-transfer apparatus with a transporting element.

The transporting elements 22a of the side routes 20a, 26a have drivers 46a, which are mounted so as to be insertable into and removable from the product sub-streams 12a, 14a of the side routes 20a, 26a, for transporting the products 24a. The drivers 46a are mounted pivotably on the transporting elements 22a and are pivoted into and out of the product sub-streams 12a, 14a through recesses 90a of the feed carrier 60a. FIG. 4 shows one of the drivers 46a in three pivoting positions. In order to control the drivers 46a, a control slot 64a, in which a control cam 66a and a guide disk 78a of the transporting elements 22a in each case engage, is provided on fixed guide apparatuses 62a of the transporting elements 22a. The control cam 66a controls the pivoting positions of the drivers 46a. The control slot 64a is designed in such a manner that the drivers 46a enter the product sub-streams 12a, 14a at the beginning of the product-stream-transfer route 18a and exit again from the product sub-streams 12a, 14a, which have now been brought together to form the main product stream 16a, at the end of the product-stream-transfer route 18a. The products 24a are transported along the product sub-streams 12a, 14a upstream of the product-stream-transfer route 18a by drivers (not illustrated specifically here) of further transporting devices and, downstream of the product-stream-transfer route 18a, are output onto drivers, which move along the main product stream 16a, of a subsequent packaging machine 50a. The drivers 46a synchronize the products 24a at the beginning and at the end of the product-stream-transfer route 18a with the drivers of the respectively preceding transporting devices or of the subsequent packaging machine 50a such that a continuous transporting operation can take place. The drivers of the further transporting devices and of the packaging machine 50a can be driven here in each case jointly by revolving transporting means, such as, for example, chains. In the example shown, the drivers 46a transfer the products 24a directly to a film tube (not illustrated specifically here) which is shaped around the products 24a by the packaging machine 50a. The film tube is formed in a known manner by the packaging machine 50a from a material web which is shaped around a shaping shoulder 92a to form the tube. By means of a longitudinal sealing unit 94a following in the transporting direction 44a, the tube is sealed in the longitudinal direction at a longitudinal seam in the direction of a weight below the products 24a. The drivers 46a are pulled back out of the main product stream 16a shortly upstream of the longitudinal sealing unit 94a.

The drivers 46a of the transporting elements 22a of the side routes 20a, 26a are mounted so as to be movable further in the direction of the transfer movement 42a. The guide disks 78a of the transporting elements 22a are moved by the control slot 64a in such a manner that the drivers 46a move in the direction of the transfer movement 42a in such a manner that said drivers are in each case located in the center of the product sub-streams 12a, 14a and can thus transport the products 24a particularly readily. The transporting elements 22a with the translators 34a themselves can therefore be guided along a rectilinear path along the product-stream-transfer route 18a by said compensating movement of the drivers 46a. Alternatively, the respective recess of the feed carrier 60a can also be designed in such a manner that said recess acts as a control slot on the drivers 46a and moves the latter in the direction of the transfer movement 42a.

Figure 3:
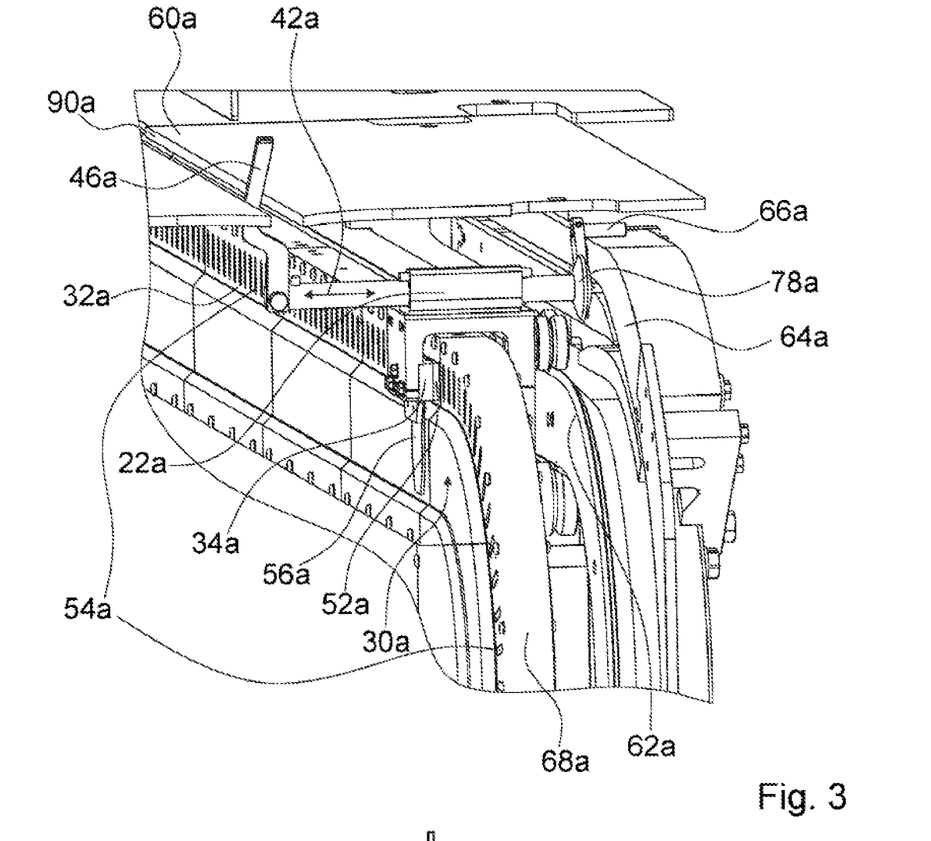
FIG. 3 shows a further detail of the product-stream-transfer apparatus with a transporting element in a deflecting region.

The transporting elements 22a are guided in a circuit by the guide apparatuses 62a. Deflecting regions 68a are located upstream and downstream of the product-stream-transfer route 18a, about which deflecting regions the transporting elements 22a are deflected in a revolution through 180° onto a reverse transporting route 70a and from the latter via the further deflecting region 68a onto the product-stream-transfer route 18a again. In the exemplary embodiment shown, the deflecting regions 68a and the reverse transporting route 70a likewise have poles 54a of the linear motor systems 30a. If the transporting elements 22a are not intended to be driven independently in the deflecting regions 68a and on the reverse transporting route 70a, the motor windings can be activated in a simplified manner in said regions such that a field of traveling waves extends along said routes and transports the transporting elements 22a at a common speed. Alternatively, a revolving transporting means, such as a belt or chain, may also be provided in order to pull the transporting elements 22a jointly around the deflecting regions 68a and along the reverse transporting route 70a.

The main product stream 16a of the product-stream-transfer apparatus 10a can form a product sub-stream of a further product-stream-transfer apparatus (not illustrated specifically here). In this manner, a plurality of product sub-streams can be transferred in the form of a cascade into a main product stream.

FIGS. 5 to 9 show further exemplary embodiments of the invention. The descriptions below and the drawing are restricted essentially to the differences between the exemplary embodiments, wherein, with regard to components denoted identically, in particular with regard to components with identical reference numbers, reference may basically also be made to the drawing and/or the descriptions of the other exemplary embodiments, in particular of FIGS. 1-4. In order to differentiate the exemplary embodiments, the letter a is placed after the reference numbers of the exemplary embodiment in FIGS. 1-4. In the exemplary embodiments of FIGS. 5-9, the letter a is replaced by the letters b to f.

Figure 5:
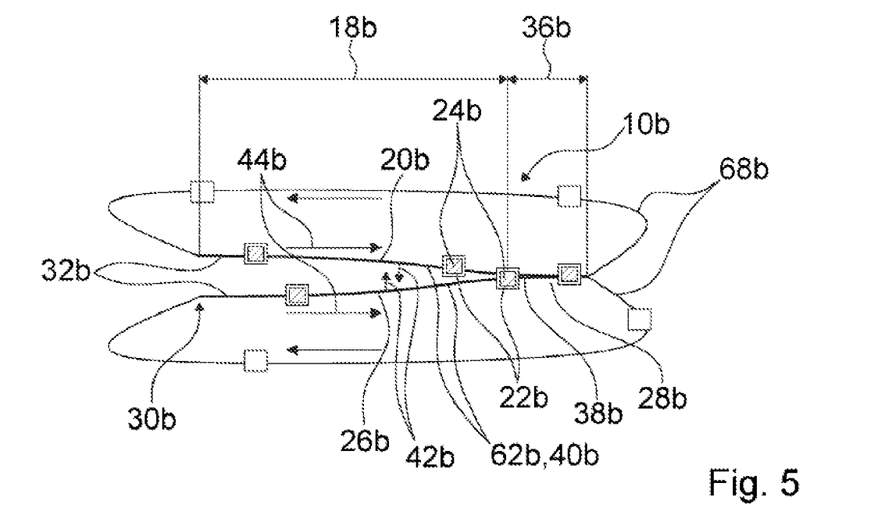
FIG. 5 shows a schematic illustration of a product-stream-transfer apparatus in a second exemplary embodiment.

FIG. 5 shows a product-stream-transfer apparatus 10b in a second exemplary embodiment. The product-stream-transfer apparatus 10b of the second exemplary embodiment differs from the product-stream-transfer apparatus 10a of the first exemplary embodiment in particular by transporting elements 22b of two side routes 20b, 26b being transferred, subsequent to a product-stream-transfer route 18b, together with products 24b transported by the transporting elements 22b onto a main route 28b. A linear motor system 30b has respectively separated stators 32b along the side routes 20b, 26b and, in the region of a section 36b of the main route 28b, which section is adjacent to the product-stream-transfer route 18b, a common stator 38b which is provided for driving the transporting elements 22b, which are transferred from the side routes 20b, 26b onto the main route 28b, along the section 36b. Guide apparatuses 62b of the transporting elements 22b therefore at the same time form product-stream-control means 40b which bring together product sub-streams 12b, 14b, which are transported on the side routes 20b, 26b, jointly with the transporting elements 22b to form a main product stream 16b, which is transported along the main route 28b, in transfer movements 42b transversely with respect to a transporting direction 44b. Downstream of the section 36b, the transporting elements 22b are divided between deflecting regions 68b of the side routes 20b, 26b and are guided back again in a circuit at the beginning of the product-stream-transfer route 18b of the side routes 20b, 26b for a next transporting circuit.

Figure 6:
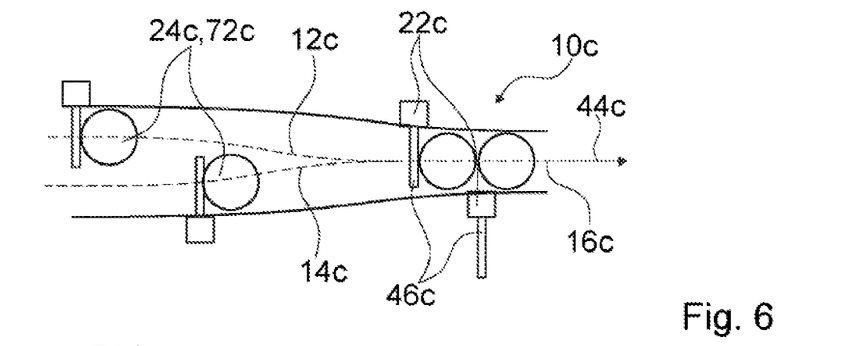
FIG. 6 shows a schematic illustration of a new grouping of products with a product-stream-transfer apparatus in a third exemplary embodiment.

FIG. 6 shows, by way of the simplified example of a further product-stream-transfer apparatus 10c, a new grouping or stacking of products 24c while the products 24c are being brought together from two product sub-streams 12c, 14c into a main product stream 16c. FIG. 6 shows the bringing together of in each case two products 24c, which are transported along the product sub-streams 12c, 14c, to form a product group which is formed by the two products 24c arranged one behind the other in a transporting direction 44c. By a driver 46c of a respective transporting element 22c being pivoted out, the product groups are formed in the main product stream 16c from the two products 24c lying one behind the other in the transporting direction 44c. Said product groups can be jointly packaged in a subsequent packaging process. Instead of individual products 24c, stack groups of stacks 72c can also be formed in this manner, wherein the stacks 72c are formed by a plurality of products 24c lying on one another.

Figure 7:
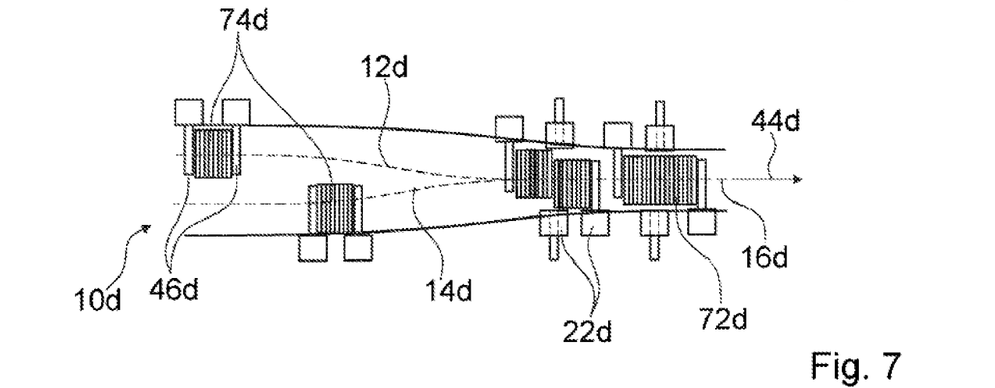
FIG. 7 shows a schematic illustration of a new grouping of products with a product-stream-transfer apparatus in a fourth exemplary embodiment.

FIG. 7 shows, by way of the simplified example of a further product-stream-transfer apparatus 10d, how, analogously to FIG. 6, stacks 72d each comprising two substacks 74d of the product sub-streams 12d, 14d are formed from substacks 74d, which are delivered in product sub-streams 12d, 14d, in a main product stream 16d. The substacks 74d are stacked in a transporting direction 44d. In order to prevent tilting of the stacks 72d and sub stacks 74d, the stacks 72d and sub stacks 74d are in each case supported by two drivers 46d, wherein one driver 46d in each case bears against opposite stack ends of the stacks 72d or substacks 74d. In the example shown, transporting elements 22d each have a driver 46d, and therefore two transporting elements 22d are required for transporting each stack 72d or substack 74d. A stack length of the stacks 72d or substacks 74d to be transported can be varied in a simple manner by a distance of the transporting elements 22d relative to one another, the transporting elements transporting a stack 72d or substack 74d, being suitably controlled. Alternatively, the transporting elements 22d can each have two drivers 46d at a suitable distance.

The product sub-streams 12c, 14c and also 12d, 14d in the two examples according to FIG. 6 and FIG. 7 can have products 24c, 24d and stacks 72c, 72d or sub stacks 74d which are formed by different types of product. In this manner, for example in order to produce mixed packs, groups comprising different types of product can be formed.

Figure 8:
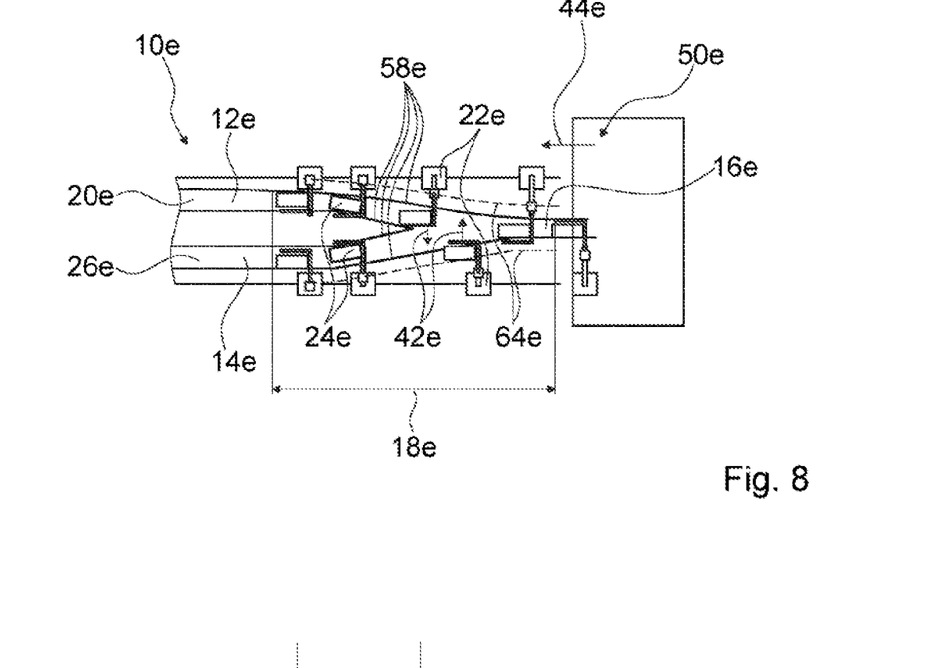
FIG. 8 shows a schematic illustration of a product-stream-transfer apparatus in a fifth exemplary embodiment, and FIGS. 9$^a$, 9$^b$, 9$^c$, 9$^d$, 9$^e$, 9$^f$ and 9$^g$ show an overview of possible product-stream-transfer apparatuses with product sub-streams and main product streams.
Figure 9A:
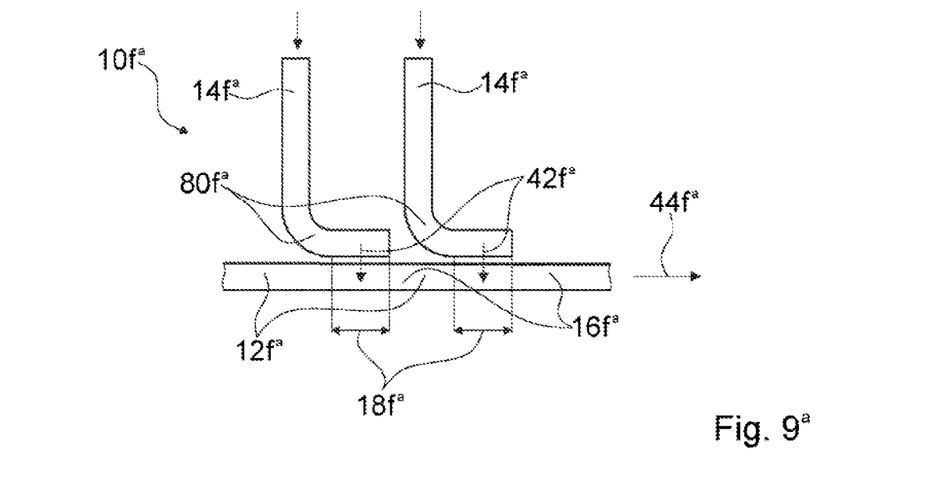
Figure 9B:
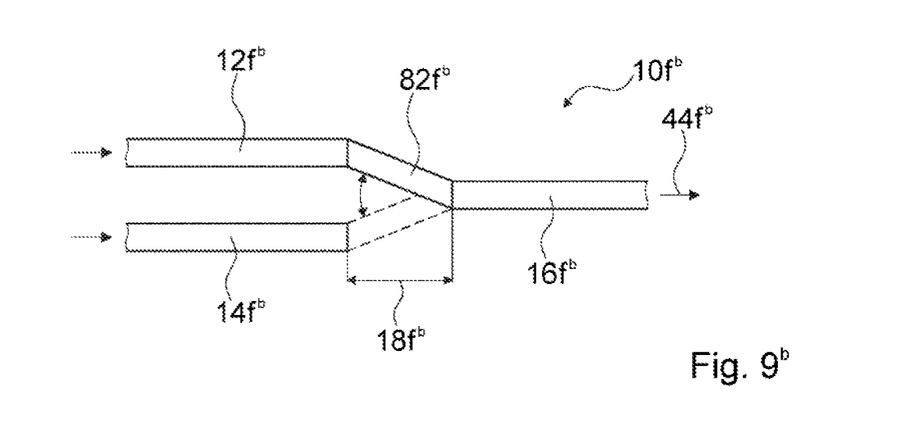
Figure 9C:
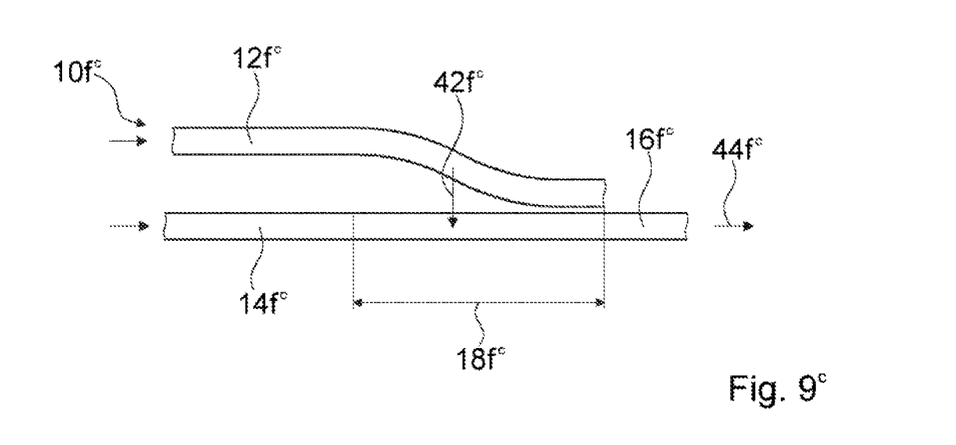
Figure 9D:
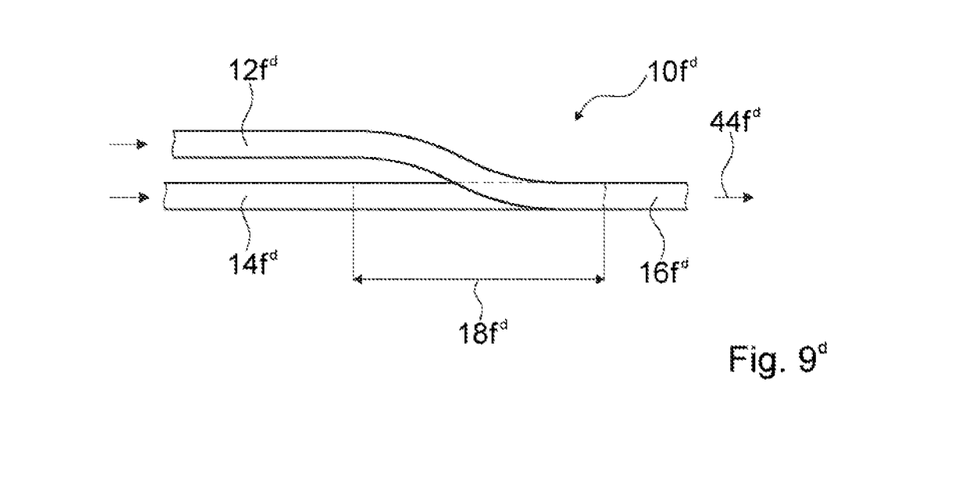
Figure 9E:
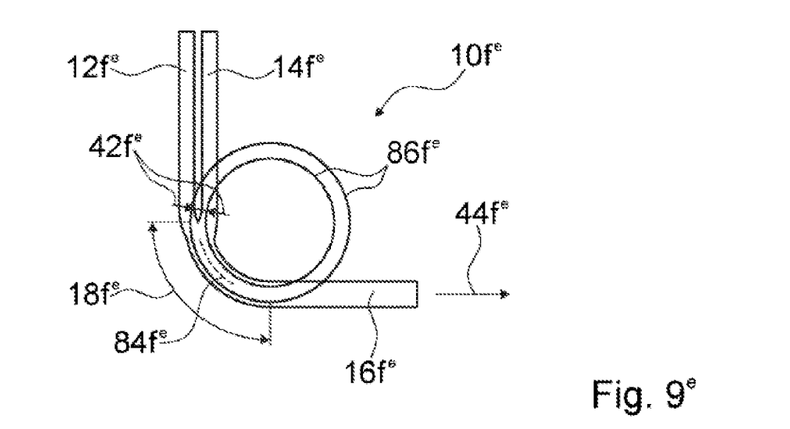
Figure 9F:
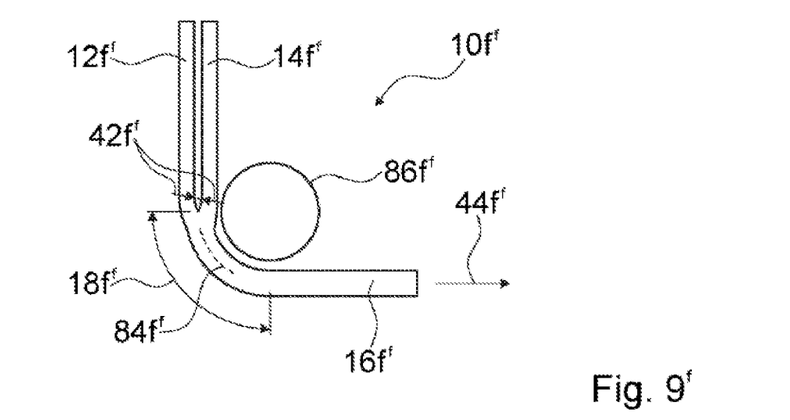
Figure 9G:
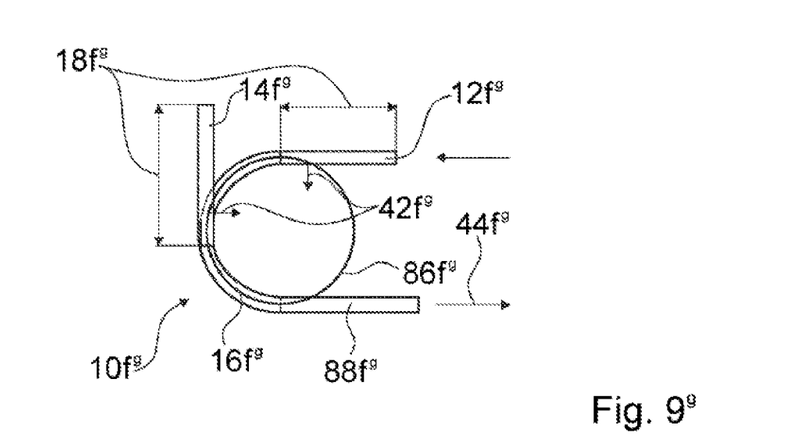

FIG. 8 shows a product-stream-transfer apparatus 10e in a fifth exemplary embodiment. The product-stream-transfer apparatus 10e of the fifth exemplary embodiment differs from the product-stream-transfer apparatus 10a of the first exemplary embodiment in particular by the product-stream-transfer apparatus 10e being provided for separating a main product stream 16e, which is delivered by a packaging machine 50e, into a first product sub-stream 12e and a further product sub-stream 14e along a product-stream-transfer route 18e. Transporting elements 22e push products 24e from a main route 28e along the product-stream-transfer route 18e. The transporting elements 22e are each assigned to one of two side routes 20e, 26e of the two product sub-streams 12e, 14e. The transporting elements 22e have product-stream-control means 40e which are designed as drivers 46e which are moved in a transfer movement 42e by a control slot 64e. The drivers 46e push the products 24e simultaneously in a transporting direction 44e along the product-stream-transfer route 18e and in the transfer movement 42e in the direction of the side routes 20e, 26e of the product sub-streams 12e, 14e of the respective transporting elements 22e. This is supported by side guides 58e which center the products 24e.

FIG. 9 shows an overview of possible configurations of product sub-streams and main product streams 12f, 14f, 16f of variants of product-stream-transfer apparatuses 10f according to the invention.

A product-stream-transfer apparatus 10f<sup>a</sup> illustrated in FIG. 9<sup>a</sup> has a first product sub-stream 12f<sup>a</sup> and two further product sub-streams 14f<sup>a</sup>. The product sub-streams 14f<sup>a</sup> are first of all guided at a steep angle of, for example, 90° to a common transporting direction 44f<sup>a</sup> of the first product sub-stream 12f<sup>a</sup> and of a main product stream 16f<sup>a</sup>. Circular arcs 80f<sup>a</sup> direct the product sub-streams 14f<sup>a</sup> in the transporting direction 44f<sup>a</sup>. In product-stream-transfer routes 18f<sup>a</sup> following the circular arcs 80f<sup>a</sup>, products (not illustrated here) of the product sub-streams 14f<sup>a</sup> are transferred into the main product stream 16f<sup>a</sup> in a transfer movement 42f<sup>a</sup> transversely with respect to the transporting direction 44f<sup>a</sup>. In the process, the main product stream 16f<sup>a</sup> again forms, downstream of the first product-stream-transfer route 18f<sup>a</sup> in the transporting direction 44f<sup>a</sup>, a product sub-stream 12f<sup>a</sup> of the second product-stream-transfer route 18f<sup>a</sup> in the transporting direction 44f<sup>a</sup>. In this example, the product sub-streams 14f<sup>a</sup> are arranged as cascades of the main product stream 16f<sup>a</sup>. It is also possible for more than the two product sub-streams 14f<sup>a</sup> shown in the example to thereby be brought together with the main product stream 16f<sup>a</sup>. In this case, the main product stream 16f<sup>a</sup> in each case again forms a product sub-stream 12f<sup>a</sup> of further product-stream-transfer routes 18f<sup>a</sup> following in the transporting direction 44f<sup>a</sup>.

A further product-stream-transfer apparatus 10f<sup>b</sup> in FIG. 9<sup>b</sup> has a product-stream-transfer route 18f<sup>b</sup> with a distributing guide 82f<sup>b</sup> which is pivoted to and fro between two product sub-streams 12f<sup>b</sup> and 14f<sup>b</sup>, takes over products of the product sub-streams 12f<sup>b</sup> and 14f<sup>b</sup> and transfers the products into a main product stream 16f<sup>b</sup>. Transporting elements (not illustrated here) can likewise be taken over by the distributing guide 82f<sup>b</sup> and brought together in the main product stream 16f<sup>b</sup> or guided in a separate circuit and can transport the products via drivers.

FIG. 9<sup>c</sup> shows a product-stream-transfer apparatus 10f<sup>c</sup> with two product sub-streams 12f<sup>c</sup> and 14f<sup>c</sup>, wherein the first product sub-stream 12f<sup>c</sup> approaches a main product stream 16f<sup>c</sup> in a transfer movement 42f<sup>c</sup> in an arc along a product-stream-transfer route 18f<sup>c</sup>, while the further product sub-stream 14f<sup>c</sup> merges rectilinearly into the main product stream 16f<sup>c</sup>. A path of the product sub-stream 14f<sup>c</sup> therefore corresponds to the path of the main product stream 16f<sup>c</sup>, and therefore an approach of the path of the product sub-stream 14f<sup>c</sup> to the main product stream 16f<sup>c</sup> is dispensed with and, with the transfer of the product sub-stream 12f<sup>c</sup>, the product sub-stream 14f<sup>c</sup> becomes the main product stream 16f<sup>c</sup>. It is possible for a plurality of product sub-streams to thereby be fed in a cascading manner to the main product stream 16f<sup>c</sup>.

FIG. 9<sup>d</sup> shows a product-stream-transfer apparatus 10f<sup>d</sup> with two product sub-streams 12f<sup>d</sup> and 14f<sup>d</sup>, wherein the first product sub-stream 12f<sup>d</sup> is arranged in the direction of a weight (not illustrated here) above a main product stream 16f<sup>d</sup>. The further product sub-stream 14f<sup>d</sup> merges rectilinearly into the main product stream 16f<sup>d</sup>, as in the preceding example. The first product sub-stream 12f<sup>d</sup> is lowered from above in a product-stream-transfer route 18f<sup>d</sup> onto the further product sub-stream 14f<sup>d</sup>, products of the first product sub-stream 12f<sup>d</sup> are deposited here onto products of the further product sub-stream 14f<sup>d</sup>, and therefore stacks consisting of in each case one product of the first product sub-stream 12f<sup>d</sup> and one product of the second product sub-stream 14f<sup>d</sup> are formed.

FIG. 9<sup>e</sup> shows a product-stream-transfer apparatus 10f<sup>e</sup> with two product sub-streams 12f<sup>e</sup> and 14f<sup>e</sup>, wherein a product-stream-transfer route 18f<sup>e</sup> is arranged in a circular arc 84f<sup>e</sup>. Alternatively to the circular arc 84f<sup>e</sup>, other revolving transporting paths, for example oval, triangular or rectangular paths, are also conceivable. Transporting elements are guided in a revolving manner on two circular paths 86f<sup>e</sup> and transfer products of the product sub-streams 12f<sup>e</sup> and 14f<sup>e</sup> onto a main product stream 16f<sup>e</sup> in radial transfer movements 42f<sup>e</sup>.

FIG. 9<sup>f</sup> shows a product-stream-transfer apparatus 10f<sup>f</sup> which differs from the preceding one in that transporting elements of two product sub-streams 12f<sup>f</sup> and 14f<sup>f</sup> are guided on a common circular path 86f<sup>f</sup>. Alternatively, differing forms of revolving transporting paths are also conceivable here. A product-stream-transfer route 18f<sup>f</sup>, in which products of the product sub-streams 12f<sup>f</sup> and 14f<sup>f</sup> are transferred onto a main product stream 16f<sup>f</sup> in radial transfer movements 42f<sup>f</sup>, is likewise arranged in a circular arc 84f<sup>f</sup>.

FIG. 9<sup>g</sup> shows a product-stream-transfer apparatus 10f<sup>g</sup> which differs from the preceding one in that product sub-streams 12f<sup>g</sup> and 14f<sup>g</sup> are transferred into the main product stream 16f<sup>g</sup> along product-stream-transfer routes 18f<sup>g</sup> tangentially at different points of a circumference of a partially circular main product stream 16f<sup>g</sup>. Transporting elements for transporting products along the product-stream-transfer routes 18f<sup>g</sup> and the circular section of the main product stream 16f<sup>g</sup> are guided in a revolving manner on a circular path 86f<sup>g</sup>. The main product stream 16f<sup>g</sup> merges at an outlet route 88f<sup>g</sup> into a rectilinear route portion which guides products of the main product stream 16f<sup>g</sup> to a packaging machine. Revolving paths differing from the circular path are also possible here.

What is claimed is:

1. A product-stream-transfer apparatus for transferring at least one first product sub-stream (12a-d; f) and a further product sub-stream (14a-d, f) into a main product stream (16a-d, f) or for separating the main product stream (16e) into the first product sub-stream (12e) and the further product sub-stream (14e) along a product-stream-transfer route (18a-b, e-f), the apparatus comprising a first side route (20a-c, e) having a multiplicity of transporting elements (22a-e) for transporting products (24a-e) of the first product sub-stream (12a-f), at least one further side route (26a-c, e) having a multiplicity of transporting elements (22a-e) for transporting products (24a-e) of the further product sub-stream (14a-f), and a main route (28a-f), which is adjacent to the product-stream-transfer route (18a-b, e-f), for transporting products (24a-f) of the main product stream (16a-f), characterized in that at least partial quantities of the transporting elements (22a-e) of one of the side routes (20a-c, e, 26a-c, e) are drivable independently from other quantities of the transporting elements (22a-e) of said one of the side routes (20a-c, e, 26a-c,e) at least along one of the side routes (20a-c, e, 26a-c, e) of the product-stream-transfer route (18a-c, e).

2. The product-stream-transfer apparatus as claimed in claim 1, further comprising at least one linear motor system (30a-b) which, at least along a side route (20a-c, e, 26a-c, e) of the product-stream-transfer route (18a-c, e), has a stator (32a-b) and a multiplicity of independently drivable translators (34a) which are provided to drive the transporting elements (22a-e) independently of one another.

3. The product-stream-transfer apparatus as claimed in claim 2, characterized in that the transporting elements (22b) of at least two side routes (20b, 26b) are transferred, subsequent to the product-stream-transfer route (18b), to the main route (28b).

4. The product-stream-transfer apparatus as claimed in claim 3, characterized in that a further stator (38b) of the linear motor system (30b) is arranged on the main route (28b) at least along a section (36b) adjacent to the productstream-transfer route (18*b*), said stator being provided for driving the transporting elements (22*b*), which are transferred from the side routes (20*b*, 26*b*) to the main route (28*b*).

5. The product-stream-transfer apparatus as claimed in claim 1, further comprising at least one product-stream-control means (40*a*; *b*; *e*) for inserting products (24*a*; *b*) of at least one of the product sub-streams (12*a*; b, 14*a*; *b*) into the main product stream (16*a*; *b*) in transfer movements (42*a*; *b*) transversely with respect to a transporting direction (44*a*; *b*) of the main product stream (16*a*; *b*) along the product-stream-transfer route (18*a*; *b*).

6. The product-stream-transfer apparatus as claimed in claim 5, characterized in that the transporting elements (22*a*; *c*; *e*) of at least one side route (20*a*; *c*; *e*, 26*a*; *c*; *e*) have drivers (46*a*; *c*; *e*), which are mounted movably in the direction of the transfer movement (42*a*; *e*), for transporting the products (24*a*; *c*; *e*).

7. The product-stream-transfer apparatus as claimed in claim 1, characterized in that the transporting elements (22*a*; *d*) of at least one side route (20*a*, 26*a*) have drivers (46*a*; *d*), which are pivotally mounted so as to be insertable into and/or removable from the product sub-stream (12*a*; d, 14*a*; *d*) of the side route (20*a*, 26*a*), for transporting the products (24*a*; *c*).

8. The product-stream-transfer apparatus as claimed in claim 1, characterized in that the main product stream (16*f*) forms a product sub-stream of a further product-stream-transfer apparatus.

9. A feed apparatus (48*a*) for a packaging machine (50*a*; *e*) with a product-stream-transfer apparatus (10*a-f*) as claimed in claim 1.

10. The product-stream-transfer apparatus as claimed in claim 2, characterized in that the transporting elements of the main route are distributed to at least two side routes at the beginning of the product-stream-transfer route.

11. The product-stream-transfer apparatus as claimed in claim 10, characterized in that a further stator (38*b*) of the linear motor system (30*b*) is arranged on the main route (28*b*) at least along a section (36*b*) adjacent to the product-stream-transfer route (18*b*), said stator being provided for driving the transporting elements (22*b*) which are to be distributed from the main route (28*b*) to the side routes (20*b*, 26*b*), along the section (36*b*).

12. The product-stream-transfer apparatus as claimed in claim 1, further comprising at least one product-stream-control means (40*a*; *b*; *e*) for distributing at least a partial quantity of the products (24*e*) of the main product stream (16*e*) to the product sub-streams (14*e*) in transfer movements (42*e*) transversely with respect to the transporting direction (44*e*) of the main product stream (16*e*) along the product-stream-transfer route (18*e*).

13. The product-stream-transfer apparatus as claimed in claim 12, characterized in that the transporting elements (22*a*; *c*; *e*) of at least one side route (20*a*; *c*; *e*, 26*a*; *c*; *e*) have drivers (46*a*; *c*; *e*), which are mounted movably in the direction of the transfer movement (42*a*; *e*), for transporting the products (24*a*; *c*; *e*).

14. A product-stream-transfer apparatus for transferring at least one first product sub-stream (12*a-d*; *f*) and a further product sub-stream (14*a-d*, *f*) into a main product stream (16*a-d*, *f*) or for separating the main product stream (16*e*) into the first product sub-stream (12*e*) and the further product sub-stream (14*e*) along a product-stream-transfer route (18*a-b*, *e-f*), the apparatus comprising a first side route (20*a-c*, *e*) having a multiplicity of transporting elements (22*a-e*) for transporting products (24*a-e*) of the first product sub-stream (12*a-f*), at least one further side route (26*a-c*, *e*) having a multiplicity of transporting elements (22*a-e*) for transporting products (24*a-e*) of the further product sub-stream (14*a-f*), and a main route (28*a-f*), which is adjacent to the product-stream-transfer route (18*a-b*, *e-f*), for transporting products (24*a-f*) of the main product stream (16*a-f*), characterized in that at least partial quantities of the transporting elements (22*a-e*) are drivable independently of one another at least along one of the side routes (20*a-c*, *e*, 26*a-c*, *e*) of the product-stream-transfer route (18*a-c*, *e*), wherein the product-stream-transfer apparatus further includes at least one linear motor system (30*a-b*) which, at least along a side route (20*a-c*, *e*, 26*a-c*, *e*) of the product-stream-transfer route (18*a-c*, *e*), has a stator (32*a-b*) and a multiplicity of independently drivable translators (34*a*) which are provided to drive the transporting elements (22*a-e*) independently of one another.

15. The product-stream-transfer apparatus as claimed in claim 14, characterized in that the transporting elements (22*b*) of at least two side routes (20*b*, 26*b*) are transferred, subsequent to the product-stream-transfer route (18*b*), to the main route (28*b*), wherein a further stator (38*b*) of the linear motor system (30*b*) is arranged on the main route (28*b*) at least along a section (36*b*) adjacent to the product-stream-transfer route (18*b*), said stator being provided for driving the transporting elements (22*b*), which are transferred from the side routes (20*b*, 26*b*) to the main route (28*b*).

16. The product-stream-transfer apparatus as claimed in claim 14, further comprising at least one product-stream-control means (40*a*; *b*; *e*) for inserting products (24*a*; *b*) of at least one of the product sub-streams (12*a*; b, 14*a*; *b*) into the main product stream (16*a*; *b*) in transfer movements (42*a*; *b*) transversely with respect to a transporting direction (44*a*; *b*) of the main product stream (16*a*; *b*) along the product-stream-transfer route (18*a*; *b*), wherein the transporting elements (22*a*; *c*; *e*) of at least one side route (20*a*; *c*; *e*, 26*a*; *c*; *e*) have drivers (46*a*; *c*; *e*), which are mounted movably in the direction of the transfer movement (42*a*; *e*), for transporting the products (24*a*; *c*; *e*).

17. The product-stream-transfer apparatus as claimed in claim 14, characterized in that the transporting elements (22*a*; *d*) of at least one side route (20*a*, 26*a*) have drivers (46*a*; d), which are pivotally mounted so as to be insertable into and/or removable from the product sub-stream (12*a*; d, 14*a*; *d*) of the side route (20*a*, 26*a*), for transporting the products (24*a*; *c*).

18. A feed apparatus (48*a*) for a packaging machine (50*a*; *e*) with a product-stream-transfer apparatus (10*a-f*) as claimed in claim 14.

19. The product-stream-transfer apparatus as claimed in claim 14, characterized in that the transporting elements of the main route are distributed to at least two side routes at the beginning of the product-stream-transfer route, wherein a further stator (38*b*) of the linear motor system (30*b*) is arranged on the main route (28*b*) at least along a section (36*b*) adjacent to the product-stream-transfer route (18*b*), said stator being provided for driving the transporting elements (22*b*) which are to be distributed from the main route (28*b*) to the side routes (20*b*, 26*b*), along the section (36*b*).

20. The product-stream-transfer apparatus as claimed in claim 14, further comprising at least one product-stream-control means (40*a*; *b*; *e*) for distributing at least a partial quantity of the products (24*e*) of the main product stream (16*e*) to the product sub-streams (14*e*) in transfer movements (42*e*) transversely with respect to the transporting direction (44*e*) of the main product stream (16*e*) along the product-stream-transfer route (18*e*), wherein the transporting elements (22*a; c; e*) of at least one side route (20*a; c; e,* 26*a; c; e*) have drivers (46*a; c; e*), which are mounted movably in the direction of the transfer movement (42*a; e*), for transporting the products (24*a; c; e*).

* * * * *